United States Patent [19]

Miers et al.

[11] Patent Number: 4,860,586

[45] Date of Patent: Aug. 29, 1989

[54] FIBEROPTIC MICROBEND ACCELEROMETER

[75] Inventors: David R. Miers, Hamburg, N.J.; David Raj, Alliance, Ohio; Deepak Varshneya, Delmar, Calif.

[73] Assignee: The Babcock & Wilcox Company, New Orleans, La.

[21] Appl. No.: 146,052

[22] Filed: Jan. 20, 1988

[51] Int. Cl.[4] .............................................. G01P 15/08
[52] U.S. Cl. .................................. 73/517 R; 73/653; 250/227
[58] Field of Search ..................... 73/517 R, 653, 800, 73/705; 250/227

[56] References Cited

U.S. PATENT DOCUMENTS

| | | | |
|---|---|---|---|
| 4,342,907 | 8/1982 | Macedo et al. | 73/800 |
| 4,436,995 | 3/1984 | Whitten | 250/227 |
| 4,634,858 | 1/1987 | Gerot et al. | 73/517 R |
| 4,800,267 | 1/1989 | Freal et al. | 73/517 R |

FOREIGN PATENT DOCUMENTS

| | | | |
|---|---|---|---|
| 0027540 | 4/1981 | European Pat. Off. | |
| 61-239129 | 10/1986 | Japan | 73/800 |
| 2125161 | 2/1984 | United Kingdom | |

OTHER PUBLICATIONS

C. M. Davis, "An Introduction to Fiberoptic Sensors," *Laser Focus*, Feb. 1982, pp. 112–115.

*Primary Examiner*—John Chapman
*Attorney, Agent, or Firm*—Vytas R. Matas; Robert J. Edwards; Daniel S. Kalka

[57] ABSTRACT

An accelerometer comprises a base and cover together defining a chamber which receives an inertial mass. A diaphragm carries the inertial mass and is bolted between the base and the cover. The inertial mass and the base have facing corrugated surfaces with offset teeth in each of the corrugated surfaces. An optical fiber is clamped between the teeth and extends between the corrugated surfaces. The intensity of light passing through the fiber changes with movement of the inertial mass with respect to the base. The inertial mass moves through the resiliency of the diaphragm, when the base is subjected to accelerations, such as those caused by vibrations. A reference optical fiber may also extend through the chamber above the inertial mass. The same light is supplied to both fibers and the intensity of light from both fibers is subtracted to leave the variation in intensity due to bending of the sensing optical fiber.

5 Claims, 2 Drawing Sheets

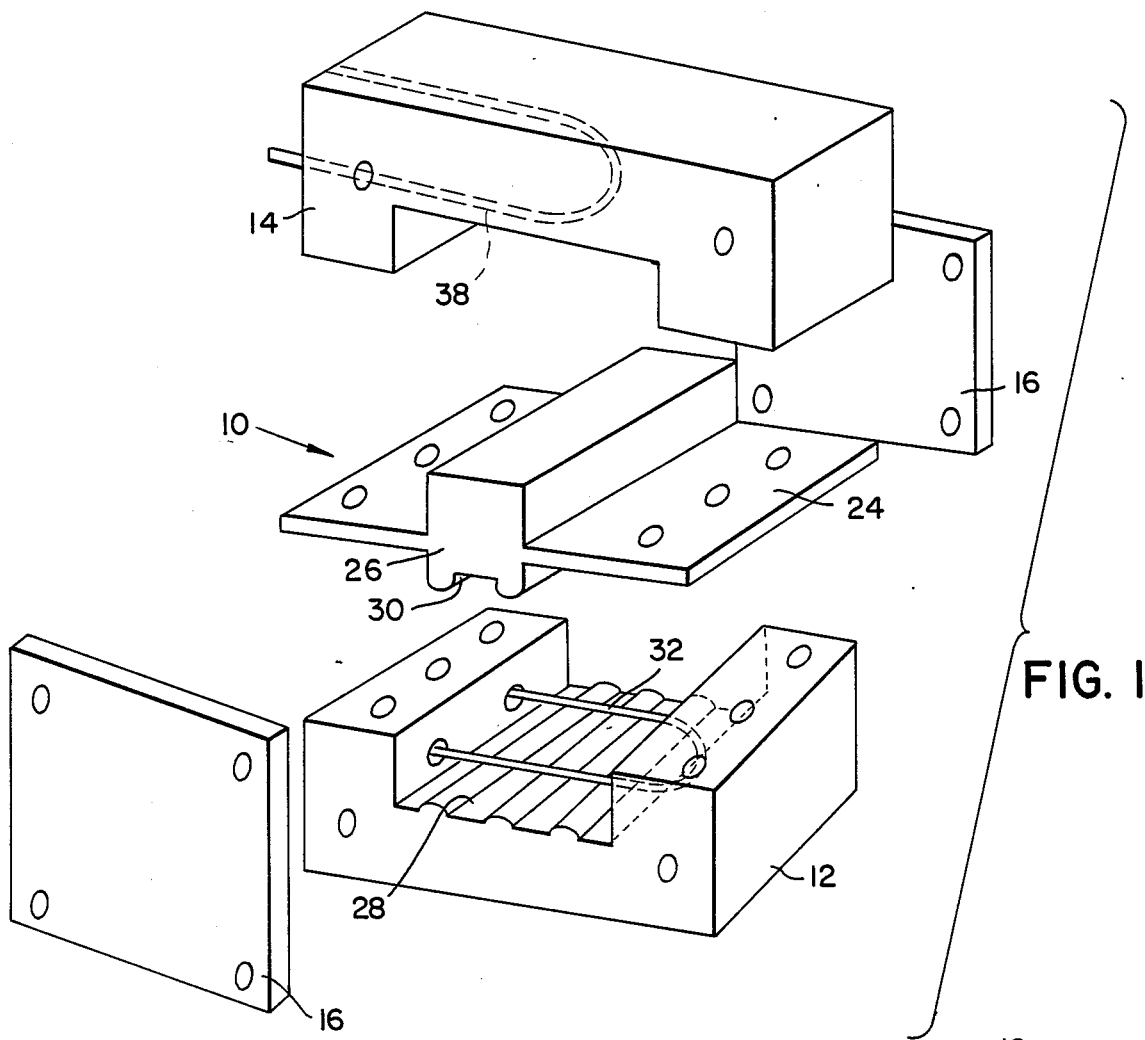
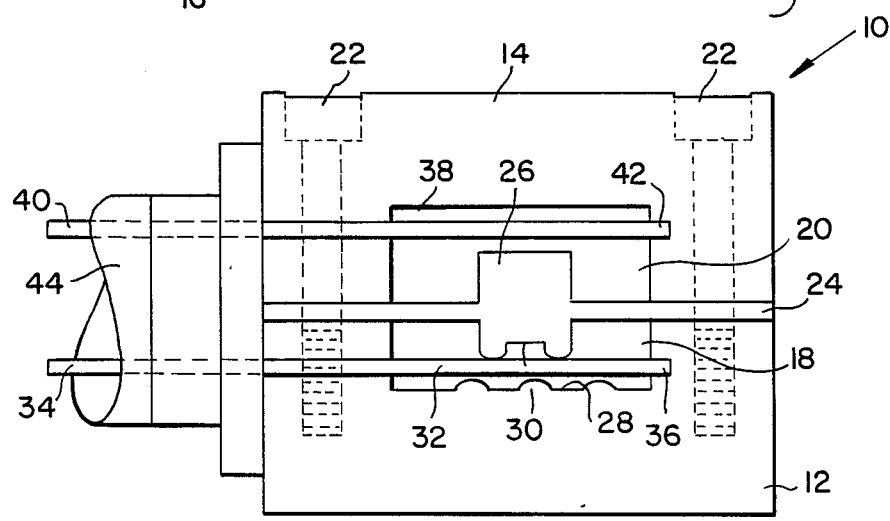
FIG. 2

FIBEROPTIC MICROBEND ACCELEROMETER

FIELD AND BACKGROUND OF THE INVENTION

The present invention relates in general to accelerometers and in particular to a new and useful fiber optic accelerometer which uses an optical fiber that is clamped between two corrugated plates to measure vibration. One of the plates acts as an inertial mass which is carried by a flexible diaphragm and which moves under the influence of vibrational forces to apply a bending force on the optical fiber. Light passing through the optical fiber varies in accordance with the bending of the fiber. This variation in the light is measured at a remote location, as an indication of the acceleration.

Accelerometers are devices which are used to measure shock and vibration. They consist of an inertial mass which is attached to a casing by a spring. When the casing is attached to a structure whose vibration (acceleration) is to be measured, the vibration of the casing is transmitted to the inertial mass. The inertial force, which is proportional to the vibrational level acts on the spring. In the case of piezoelectric accelerometers, a piezoelectric crystal acts as a spring. The inertial mass acts on the crystal and induces a charge which is proportional to the force. The charge, which gives a measurement of the vibrational level, is measured. In the case of the piezoresistive or strain gage accelerometer, the deformation of the spring caused by inertial force is measured using strain gages.

Both types of accelerometers can be used for room temperature applications. At high temperatures, however, only the piezoelectric accelerometers can be used. These, however, show limitations when used in pressurized water reactor (PWR) environments.

Tests have been performed to determine the performance of piezoelectric and other commercially available accelerometers, in hostile PWR environments. In these environments, pressures in excess of 2,500 psi, temperatures of up to about 700° F. and corrosive chemicals can be expected. These tests show that most conventional piezoelectric accelerometers do not survive such conditions. The accelerometers with synthetic crystals failed within a period of a few days. Only one accelerometer passed the qualifying tests. This accelerometer contains a natural crystal as opposed to a synthetic one, and costs about $5,000.

Accelerometers which use fiber optic systems are known. One example is found in U.S. Pat. No. 4,408,495 to Couch et al. Couch et al measures the displacement of a vibrating object with respect to a fixed reference. No provision is made to measure the absolute acceleration of a vibrating object however. To obtain the absolute acceleration from the displacement with respect to the fixed reference requires that the relative displacement be differentiated twice. This is done with sophisticated electronics and is inherently a "noisy" operation. Any noise in the displacement signal is greatly amplified when the signal is differentiated twice to reach the acceleration value.

In requiring a fixed reference, the application of the Couch et al patent is also limited since a fixed reference is usually not available to measure vibration. In cases where the reference surface is undergoing vibration, the absolute vibration of the reference must be known.

U.S. Pat. No. 4,552,026 to Knudsen et al describes a sensor for a vortex shedding flowmeter which utilizes an optical fiber that is clamped between inner and outer tooth rings. Relative rotation between the rings as a result of the passage of vortices, causes a microbending of the optical fiber. Light passing through the optical fiber is thus varied and this variation is measured to measure the flow rate as a function of the shed vortices.

Other U.S. Patents which utilize optical fibers in accelerometers are U.S. Pat. Nos. 4,353,259 to Schneider, Jr.; 4,376,390 to Rines; 4,403,144 to Strahan et al and 4,525,626 to Kush et al.

Other devices which are interesting for their disclosure of optical mechanisms for use in measuring different parameters are U.S. Pat. Nos. 4,471,659 to Udd et al; 4,405,198 to Taylor; 4,379,226 to Sichling et al; 4,414,471 to Rines; 4,472,022 to Bearcroft et al and 4,214,485 to Berger et al.

SUMMARY OF THE INVENTION

The invention comprises an accelerometer which utilizes an optical fiber which is clamped between teeth of a base on one side and teeth of an inertial mass on an opposite side. When the base is subjected to acceleration, for example, due to vibrations of a structure to which the base is connected, the inertial mass moves with respect to the base, thereby bending the optical fibers between the teeth of the base and inertial mass. The intensity of light passing through the fiber then varies in response to the bending of the fiber. This variation in light intensity is a direct measurement of the acceleration to which the accelerometer was subjected.

The attenuation of light is caused by the microbending of the fiber and is proportional to the applied load. The applied load in turn is proportional to the vibration (acceleration) to which the accelerometer was subjected. The spring of the accelerometer in accordance with the present invention is provided by the stiffness of the diaphragm which carries the inertial mass. The diaphragm serves also to preload the fiber. This preloading is necessary to obtain a linear relationship between the light output and the spacing between the corrugated plates or surfaces that carry the teeth. The light being transmitted by the optical fiber is modulated with the amplitude of the vibration and may be detected as a function of time using a photodiode and suitable signal processing electronics.

To avoid damage to the optical fiber and other components, from corrosive fluids, a cover is connected over the base and defines a pressure sealed chamber with the base, in which the inertial mass and diaphragm are positioned. The base and cover, as well as the diaphragm and inertial mass, can be made from one parent material, for example of Inconel, to avoid corrosion and minimize thermally induced stresses. This also prevents problems such as hysteresis associated with changes in the properties of the diaphragm material, plates and any optical fiber coating. This would be true in particular when the accelerometer is used in extreme conditions such as high temperatures (about 700° F.) and high pressures (above 2000 psi).

Accordingly, an object of the present invention is to provide an accelerometer which comprises a base having a first corrugated surface with a plurality of spaced teeth thereon, an inertial mass having a second corrugated surface with a plurality of spaced teeth thereon, a diaphragm connected to the base and carrying the inertial mass with the first and second corrugated surfaces facing each other and the teeth of the inertial mass being offset with respect to the teeth of the base, and an optical fiber extending between the corrugated surfaces and clamped between the teeth of the inertial mass and the base. The inertial mass moves with respect to the base when the base is subjected to vibrations or other accelerations, to bend the optical fiber and thus attenuate light passing through the fiber. The amount of attenuation is used as a measurement of the acceleration to which the base was subjected.

A further object of the present invention is to provide an accelerometer which is simple in design, rugged in construction and economical to manufacture, and one which can survive harsh conditions such as elevated temperature and pressure. Such conditions would make the accelerometer of the present invention particularly suitable for a pressurized water reactor or other type of nuclear reactor environments.

BRIEF DESCRIPTION OF THE DRAWINGS

In the drawings:

FIG. 1 is an exploded perspective view of an accelerometer in accordance with the present invention;

FIG. 2 is a sectional view of the accelerometer assembled from the parts shown in FIG. 1;

DESCRIPTION OF THE PREFERRED EMBODIMENT

Figure 3:
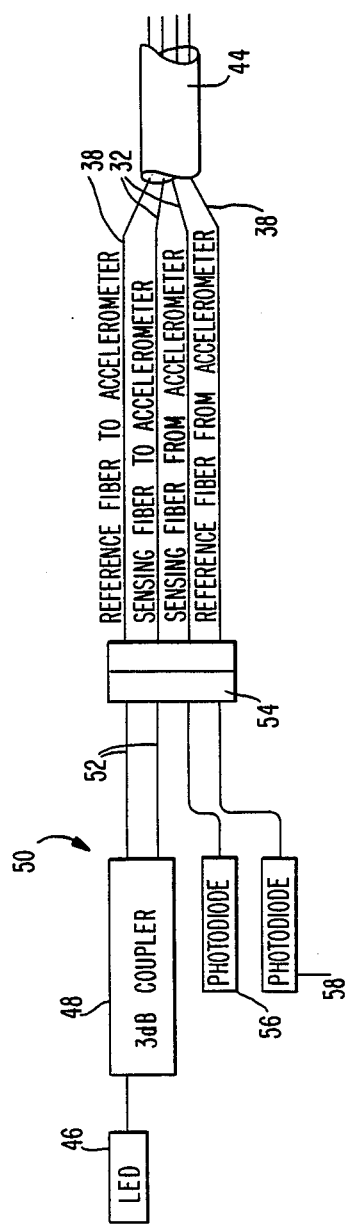
FIG. 3 is a block diagram showing the operating system of the accelerometer of FIG. 2.

Referring to the drawings in particular, the invention embodied in FIGS. 1 and 2 comprises an accelerometer having a head 10 which is meant to be fixed firmly to a structure that is subjected to vibrations, for the purpose of measuring the acceleration to which the structure is subjected. The head 10 comprises a base 12 having a recess 18 and a cover 14 having a recess 20. The base is connected to the cover by bolts 22 so that the diaphragm can be fixed between the cover and base as shown in FIG. 2. The diaphragm 24 carries an inertial mass 26 which can be made, for example, as one part with diaphragm 24.

Side plates 16 can be bolted to the sides of the base and cover to enclose recesses 18 and 20 to form a hermetically sealed chamber in which the inertial mass 26 and diaphragm 24 are housed.

Base 12 includes a first corrugated surface 28 and inertial mass 26 includes a second corrugated surface 30. Corrugated surface 28 and 30 carry spaced apart teeth with the teeth of corrugated surface 30 being offset with respect to the teeth of corrugated surface 28.

A sensing optical fiber 32 has a U-shaped bend which is positioned between the teeth of corrugated surfaces 28 and 30. Diaphragm 24 is positioned with respect to base 12 so as to exert a selected preload on the optical fiber and thus cause microbends in the optical fiber 32 between the corrugated surfaces 28 and 30. Ends 34 of optical fiber 32 extend through parallel holes at one end of base 12. The top of the U-shaped loop of sensing fiber 32 is seated in a curved recess 36 for mechanically holding this end of the fiber.

A reference optical fiber 38 has ends 40 which extend through parallel holes in the cover 14 and form a U-shaped loop in the upper recess of the cover 14. The top of the U-shaped loop of fiber 38 sits in a curved recess 42 of the cover 14.

In operation, and with the base 12 bolted or otherwise secured to a vibrating structure (not shown), when the base is subjected to accelerations (vibrations) the inertial mass 26 moves with respect to the base due to the resiliency of diaphragm 24. This causes variations in the bending of the sensing fiber 32 which attenuates light passing through the fiber.

The reference fiber 38 receives the same input light signal as the sensing fiber 32. The two light signals are then compared with each other when they leave the optical fiber 32 and 38. In this way only the variations in light remain. The reference optical fiber 38 is used to compensate for any light source fluctuations, temperature changes, extraneous bending, shocks or other perturbations between the accelerometer head 10 optical fibers and an operating system 50 shown in FIG. 3. The reference fiber 38 negates influences which are exerted equally on reference fiber 38 and sensing fiber 32.

Turning now to FIG. 3, the operating system 50 comprises a light emitting diode 46 whose light is applied through a fiber optic coupler 48 and optical fiber connections 52, to a fiber optic coupler 54. The two ends of the reference optical fiber 38 and the two ends of the sensor optical fiber 32 are connected to the coupler 54 and extend through a protective cable 44 to the head 10. The light carried by one leg of the reference and sensing fibers is thus supplied through cable 44 to the accelerometer head. The light is then passed back through the returning legs of fibers 32 and 38 through coupler 54 and to a pair of photodiodes 56 and 58.

Figure 4:
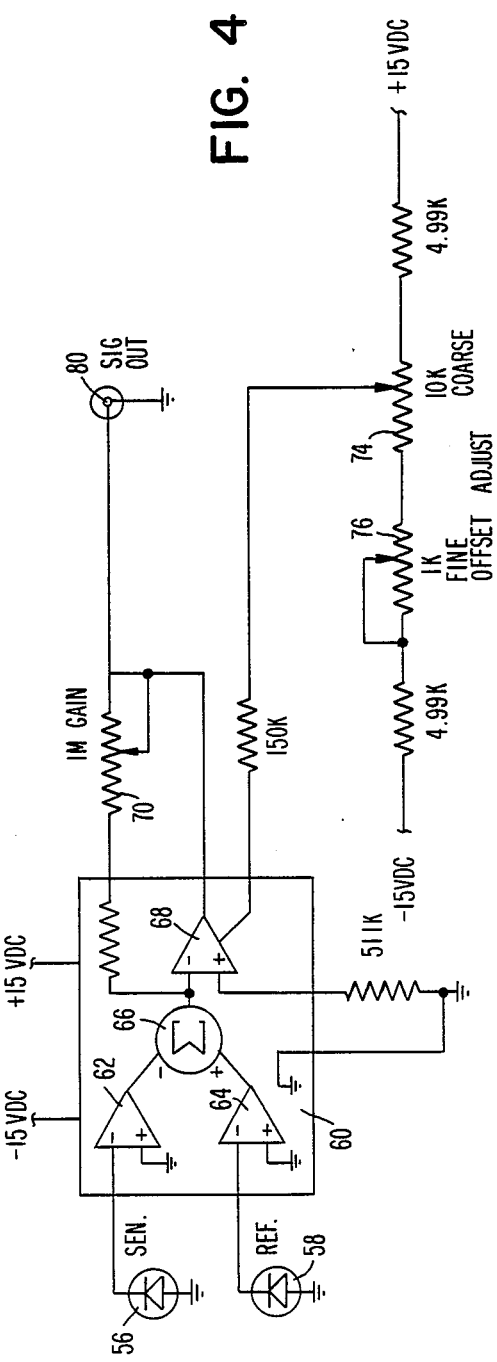
FIG. 4 is a schematic diagram showing an electronic circuit that can be used for measuring the light signals from the optical fibers of the present invention and converting them to electrical signals which are proportional to the acceleration to be measured by the accelerometer.

As shown in FIG. 4, diodes 56 and 58 are connected respectively to the negative input of amplifiers 62 and 64 in a log-ratio amplifier device 60. This may be the Analog Devices 757N Log-Ratio amplifier. The logarithms of the light intensities measured by diodes 56 and 58 are taken by the amplifiers 62 and 64. The signal from the reference fiber is then subtracted from the signal of the sensor fiber in a difference unit 66 whose output is the logarithm of the intensity ratio. This is then scaled by an output buffer amplifier 68 to provide the required calibration. The scaling (gain) is adjusted by the gain potentiometer 70. The function of the difference unit 66 may also be directly incorporated in the buffer amplifier 68. An offset null adjustment is made on the amplifier 68 by a coarse offset adjustment potentiometer 74 and a fine offset adjustment potentiometer 76 to remove the DC levels which are caused by the connectors, initial intensity ratios, and the like. The conditioning electronics of FIG. 4 are simple yet quite accurate.

The output signal terminal 80 provides a signal in millivolts which corresponds to the acceleration (g's) to which the accelerometer head was subjected.

The mathematical method which is implemented by the circuitry of FIG. 4 assumes that the acceleration signal 80 is proportional to the log of the intensity ratio as follows:

$$\text{Log} \frac{I_s}{I_r} = \text{Log} \frac{I_{so}}{I_{ro}} - (\text{connector losses})_s +$$

$$(\text{connector losses})_r - (\text{fiber attenuation})_s + (\text{fiber attenuation})_r -$$

-continued (fiber bend loss)$_s$ + (fiber bend loss)$_r$ − 1/K (acc).

where $I_S$=light intensity exiting signal channel, $I_r$=light intensity exiting reference channel, $I_{So}$=light intensity entering the signal channel, $I_{ro}$=light intensity entering the reference channel, (acc)=the acceleration signal, K=gain.

Most of the quantities on the right-hand side of the equation are constant. By subtracting a static offset value from these, the intensity ratio may be expressed as:

$$(acc) = -K \log \frac{I_s}{I_r}$$

The result is a signal that should be independent of all external perturbations except the acceleration signal developed by the microbend sensor. These perturbations include transmission losses such as connector losses, attenuation and bending losses, cable length losses and also fluctuations in the source intensity and coupler losses.

The accelerometer constructed in accordance with the present invention has measured accelerations from −100 to +100 g over a frequency range of 0−1000 Hz. The unit can survive a shock of up to ±2000 g, with no effect on its performance or calibration. With small design modifications, the accelerometer can be made to measure higher accelerations and operate over a larger frequency range. The accelerometer can operate in areas of high electromagnetic interference with no degradation of performance since the sensor is completely passive. The optical fiber cable is entirely dielectric and the electronics of the operating system may be shielded and kept remote from the accelerometer head. The accelerometer head can withstand a corrosive environment, temperatures up to 700° F. and pressures up to 3000 psi.

The invention claimed is:

1. An accelerometer, comprising:
a base having a first corrugated surface with a plurality of spaced apart teeth thereon;
an inertial mass having a second corrugated surface with a plurality of spaced teeth thereon;
a diaphragm connected to said base and carrying said inertial mass with said first and second corrugated surfaces facing each other and said teeth of said inertial mass being offset with respect to said teeth of said base;
an optical fiber extending between said corrugated surfaces and being clamped between said teeth of said inertial mass and said base, said inertial mass moving with respect to said base when said base is subjected to acceleration to bend said optical fiber between said teeth thereby causing light passing through said optical fiber to change in intensity; and
a cover connected to said base and extending over said inertial mass, said base and cover together defining a hermetically sealed chamber containing said inertial mass.

2. An accelerometer, comprising:
a base having a first corrugated surface with a plurality of spaced apart teeth thereon;
an inertial mass having a second corrugated surface with a plurality of spaced apart teeth thereon;
a diaphragm connected to said base and carrying said inertial mass with said first and second corrugated surfaces facing each other and said teeth of said inertial mass being offset with respect to said teeth of said base;
an optical fiber extending between said corrugated surfaces and being clamped between said teeth of said inertial mass and said base, said inertial mass moving with respect to said base when said base is subjected to acceleration to bend said optical fiber between said teeth thereby causing light passing through said optical fiber to change in intensity;
a cover connected to said base and extending over said inertial mass, said base and cover together defining a sealed chamber containing said inertial mass;
a second optical fiber extending through said chamber at a location spaced from said first-mentioned optical fiber, said first-mentioned optical fiber being a sensing fiber and said second optical fiber being a reference; and
light means connected to said sensing and said reference fibers for supplying light of equal intensity to said sensing and reference fibers.

3. An accelerometer according to claim 2 including light sensing means connected to said sensing and reference fibers for receiving light from said light means, said light sensing means operating to take logarithm of the intensity of light of the sensing and reference fibers and to subtract the logarithms from each other to give the logarithm of the intensity ratio between the reference and sensing fiber, and scaling means connected to said light sening means for scaling the longarithm of the intensity ratio to provide a scaled measurement of the acceleration to which the base is subjected.

4. An accelerometer according to claim 2 wherein said diaphragm is plate-shaped, ssaid inertial mass extending the width of said diaphragm and positioned near the center of the length of said diaphragm, said diaphragm having outer ends fixed to said base.

5. An accelerometer according to claim 4 wherein said base includes a recess for receiving said inertial mass, a cover connected to said base and fixed over said end of said diaphragm, said cover including a recess over said recess of said base, said inertial mass being positioned also in said recess of said cover.

* * * * *